United States Patent [19]

Andrejco et al.

[11] 4,428,762
[45] Jan. 31, 1984

[54] VAPOR-PHASE AXIAL DEPOSITION SYSTEM

[75] Inventors: Matthew J. Andrejco, North Hanover Township, Burlington County; Eugene Potkay, Hamilton Township, Mercer County, both of N.J.

[73] Assignee: Western Electric Company, Inc., New York, N.Y.

[21] Appl. No.: 371,629

[22] Filed: Apr. 26, 1982

[51] Int. Cl.³ .................. C03B 19/06; C03B 37/025; C03B 37/07

[52] U.S. Cl. ...................................... 65/3.12; 65/13; 65/18.2; 65/144; 118/724; 118/730

[58] Field of Search ............. 65/3.12, 18.2, 144, 65/13; 427/163; 118/724, 730

[56] References Cited

U.S. PATENT DOCUMENTS

| | | | |
|---|---|---|---|
| 932,739 | 8/1909 | Wiss | 239/424 |
| 1,313,605 | 8/1919 | Reynolds | 239/417 |
| 1,385,884 | 7/1921 | Moss | 417/165 |
| 1,420,217 | 6/1922 | Richards | 138/44 |
| 1,483,229 | 2/1924 | Maclachlan | 98/115 R |
| 1,639,179 | 8/1927 | Hamel | 261/116 |
| 1,820,530 | 8/1931 | Davies | 55/441 |
| 2,104,958 | 1/1938 | Thompson | 417/156 |
| 2,702,605 | 2/1955 | Kneass, Jr. | 55/468 |
| 2,944,386 | 7/1960 | Bertin et al. | 261/116 |
| 3,073,534 | 1/1963 | Hampshire | 239/422 |
| 3,642,521 | 2/1972 | Moltzan | 427/423 |
| 3,644,607 | 2/1972 | Roques et al. | 264/60 |
| 3,688,835 | 6/1972 | Vicard | 55/107 |
| 3,698,936 | 10/1972 | Moltzan | 264/81 |
| 3,771,365 | 11/1973 | Schempp | 55/274 |
| 3,966,446 | 6/1976 | Miller | 65/3.12 X |
| 4,062,665 | 12/1977 | Izawa et al. | 65/3.12 |
| 4,135,901 | 1/1979 | Fujiwara et al. | 65/3.12 X |
| 4,162,908 | 7/1979 | Rau et al. | 65/3.12 |
| 4,224,046 | 9/1980 | Izawa et al. | 65/3.12 |
| 4,242,118 | 12/1980 | Irven | 65/3.12 |
| 4,261,720 | 4/1981 | Helbing | 65/2 |
| 4,345,928 | 8/1982 | Kawachi et al. | 65/3.12 X |
| 4,367,085 | 1/1983 | Suto et al. | 65/3.12 X |

FOREIGN PATENT DOCUMENTS

| 502001 | 4/1951 | Belgium | 55/441 |
|---|---|---|---|
| 163782 | 5/1921 | United Kingdom | 239/422 |

*Primary Examiner*—Richard V. Fisher
*Attorney, Agent, or Firm*—D. J. Kirk

[57] ABSTRACT

A vapor-phase axial deposition system (5) for fabricating a lightguide soot boule (16). The system (5) is comprised of a short cylindrical housing (10) having end plates (26—26) affixed thereto. A starting member (58) is radially directed into the central portion of the housing (10) and a torch (12) is activated to direct a stream of glassy soot thereat. The member (58) is simultaneously rotated and withdrawn from the housing (10) as a cylindrical, porous, soot boule is formed on the end thereof. The housing (10) having a substantially two-dimensional character eliminates secondary gas flow within the housing (10) resulting in enhanced deposition rates and repeatability.

11 Claims, 12 Drawing Figures

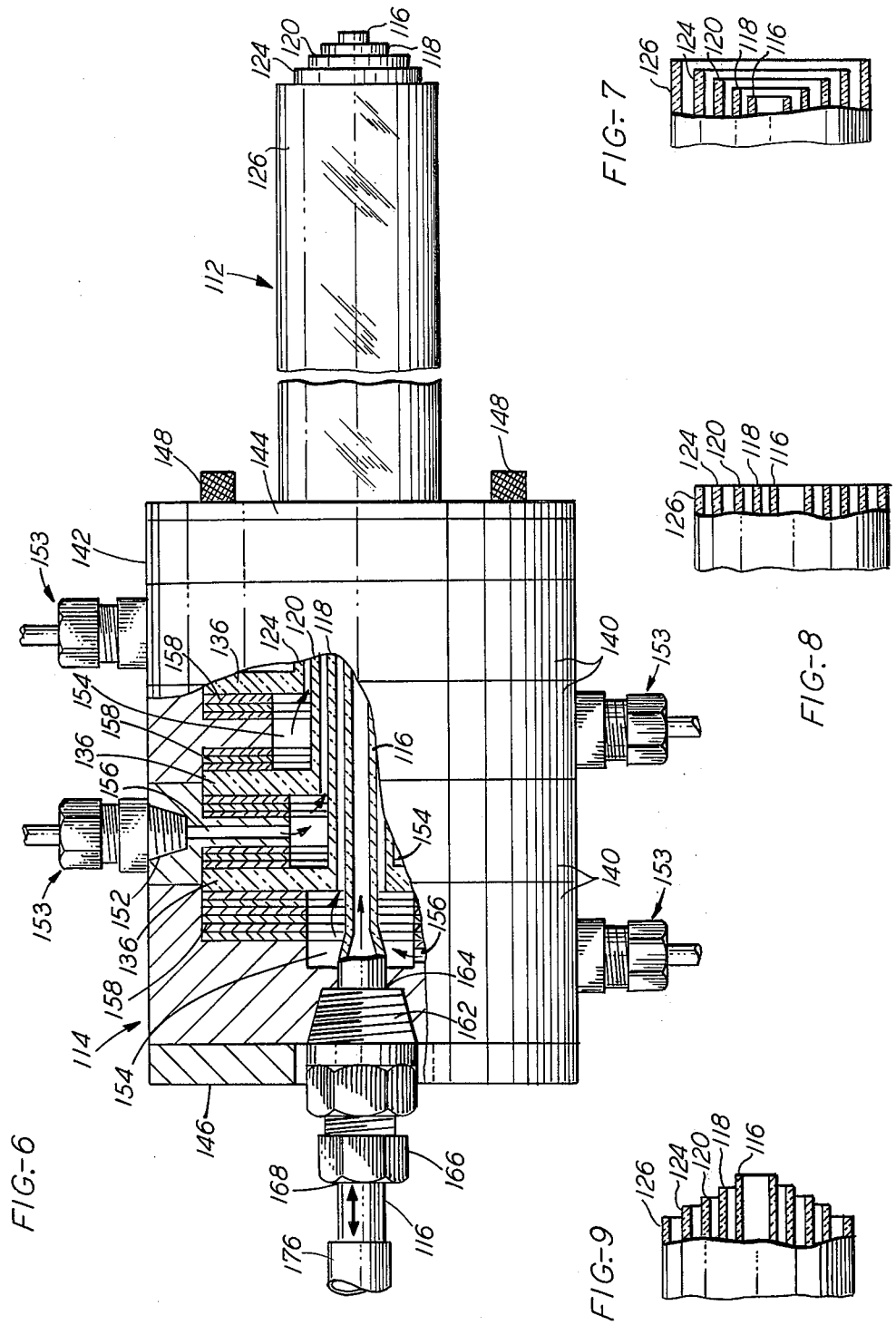

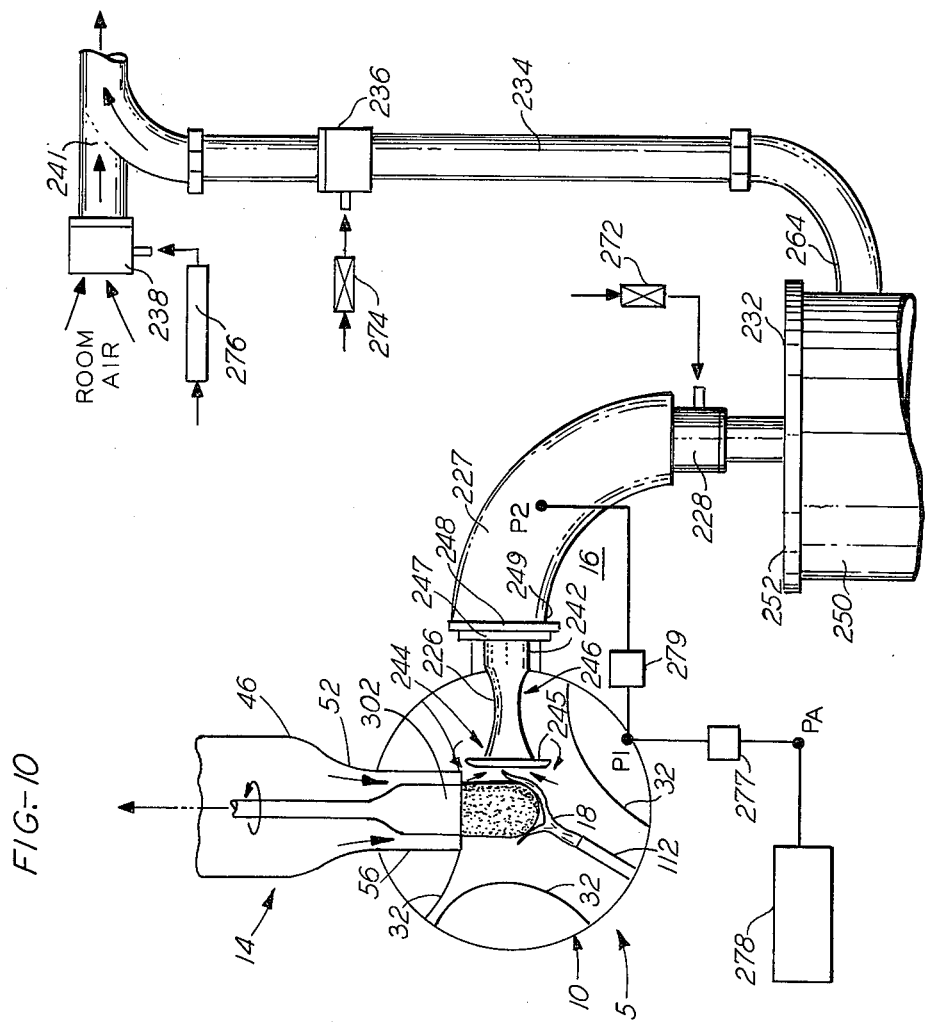

VAPOR-PHASE AXIAL DEPOSITION SYSTEM

TECHNICAL FIELD

The instant invention relates to methods and apparatus for fabricating a lightguide preform. In particular, the invention is directed to the fabrication of such a preform using vapor-phase axial deposition techniques.

BACKGROUND OF THE INVENTION

Lightguide fiber is drawn from a solid glass cylinder or preform. One particular technique for fabricating such a preform is described in U.S. Pat. No. 4,062,665 to Izawa et al. which issued Dec. 13, 1977 and has been commonly referred to as the vapor-phase axial deposition (VAD) method.

The VAD technique uses a refractory starting member projecting axially into the central portion of an elongated cylindrical chamber. The member rotates along its axis of rotation, which is coincident with the chamber axis, as it is withdrawn therefrom. A glass raw material is introduced into a high temperature portion of a flame near the tip of a stationary torch producing a glassy particulate or soot which is directed onto the end of the rotating refractory starting member. A substantially cylindrical boule of porous soot is formed on the starting member as it is continuously withdrawn from the chamber at a rate equal to the growth rate of the soot upon the boule. The withdrawn soot boule is then subjected to an elevated temperature to consolidate the porous material into a solid, clear cylindrical lightguide preform. Such a technique has been found capable of fabricating lightguide preforms from which low loss lightguide fiber has been drawn.

It has been observed that extremely small variations in pressure ($<<0.25$ mm $H_2O$) within the VAD chamber will cause the flame to wander and flicker resulting in inefficient, nonuniform deposition, loss of reactant materials and a lack of repeatability between runs. Prior art VAD chambers have been substantially spherical or elongated cylinders. In such chambers large dead spaces are present which permit gas circulation due to the natural convection driven by the temperature difference between the torch-boule region and the chamber walls. Such secondary circulation is never symmetrical or regular and therefore, undesirably, induces random variations of the local flow and pressure fields at the flame-deposition site on the boule.

Accordingly, there is a need for a system for repeatably reproducing uniform, high quality, lightguide preforms using the VAD process.

SUMMARY OF THE INVENTION

The instant invention overcomes the foregoing problems with a vapor-phase axial deposition system for fabricating a substantially cylindrical lightguide soot boule. The system is comprised of an elongated starting means mounted for rotation about and translation along the axis thereof; means for projecting a stream of soot, in a first plane, towards the starting means to form the soot boule thereon, the axes of the starting means and the soot stream being in a first plane; and first and second plates mounted in parallel relation to each other and to the first plane which is located therebetween, the distance between said plates being sufficiently close so as to substantially eliminate secondary flow of gas therebetween during deposition of the soot boule. Advantageously, since the deposition system is substantially two-dimensional, large secondary circulation cells which are three-dimensional in nature are inhibited due to the confinement imposed by the limited distance between the plates.

BRIEF DESCRIPTION OF THE DRAWINGS

FIG. 6 is a cross-sectional view of the soot torch;

FIGS. 7, 8 and 9 are exemplary end configurations of the soot torch;

FIG. 10 is a schematic view of the instant VAD system;

DETAILED DESCRIPTION

Figure 1:
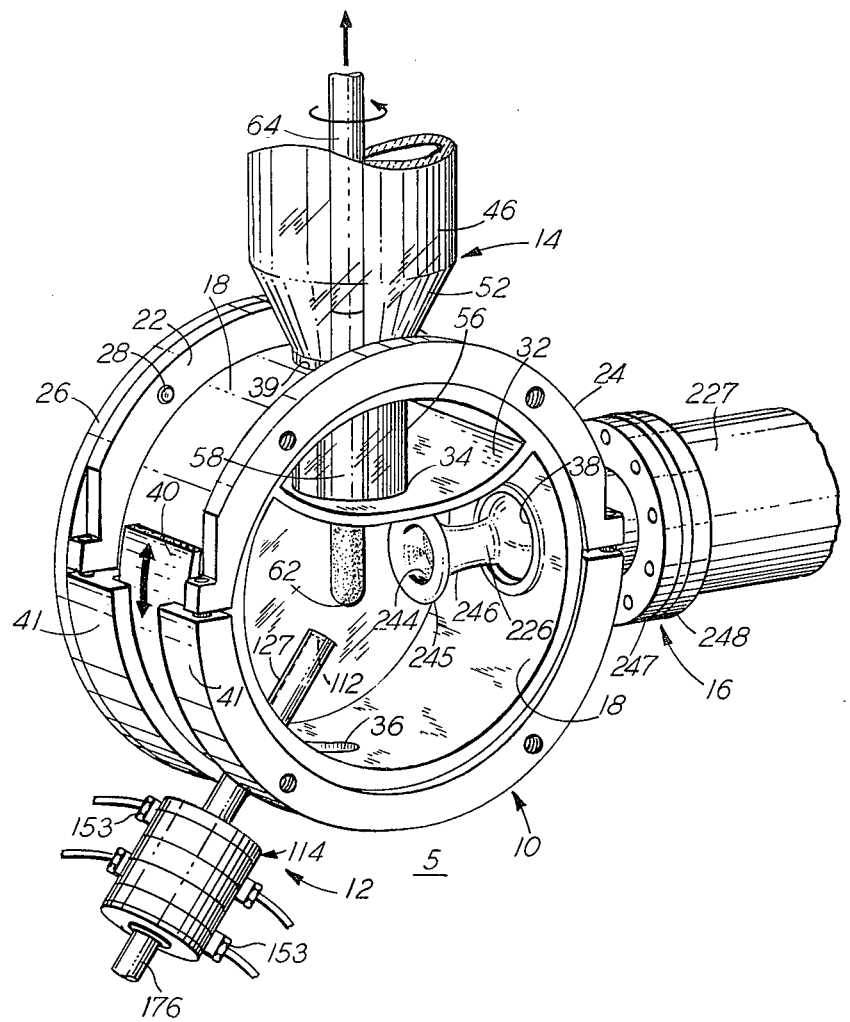
FIG. 1 is an isometric view of the instant VAD chamber.

FIG. 1 is an isometric view of the instant VAD system, generally referred to by the numeral 5, comprised of a housing 10, a torch 12, an input section 14 and an exhaust system 16 (also see FIG. 10).

The housing 10 has a short cylindrical body 18 with front and rear flanges 22 and 24, respectively. The diameter of the cylindrical body 18 is much greater than the length thereof. A substantially planar, circular, coverplate 26 is removably fastened to the rear flange 24 by bolts 28—28. A similar coverplate (not shown) is also fastened to the front flange 24 during operation. An arcuate shaped baffle 32 having an opening 34 therein is mounted within the housing 10. The body 18 has an elongated slot 36 and first and second ports 38 and 39, respectively, therein. An arcuate plate 40 is slidably positioned between opposed guide members 41—41 and the cylindrical body 18.

The input section 14 is comprised of a hollow, cylindrical member 46, a tapered section 52 and a hollow, small diameter section 56 which passes through the port 39, and terminates at the opening 34 in the baffle 32. A starting member 58 which may be a hollow glass tube having a rounded end portion 62 (e.g., a test tube) is removably connected to a rotatable rod 64 which can move towards or away from the center of the housing 10.

Figure 2:
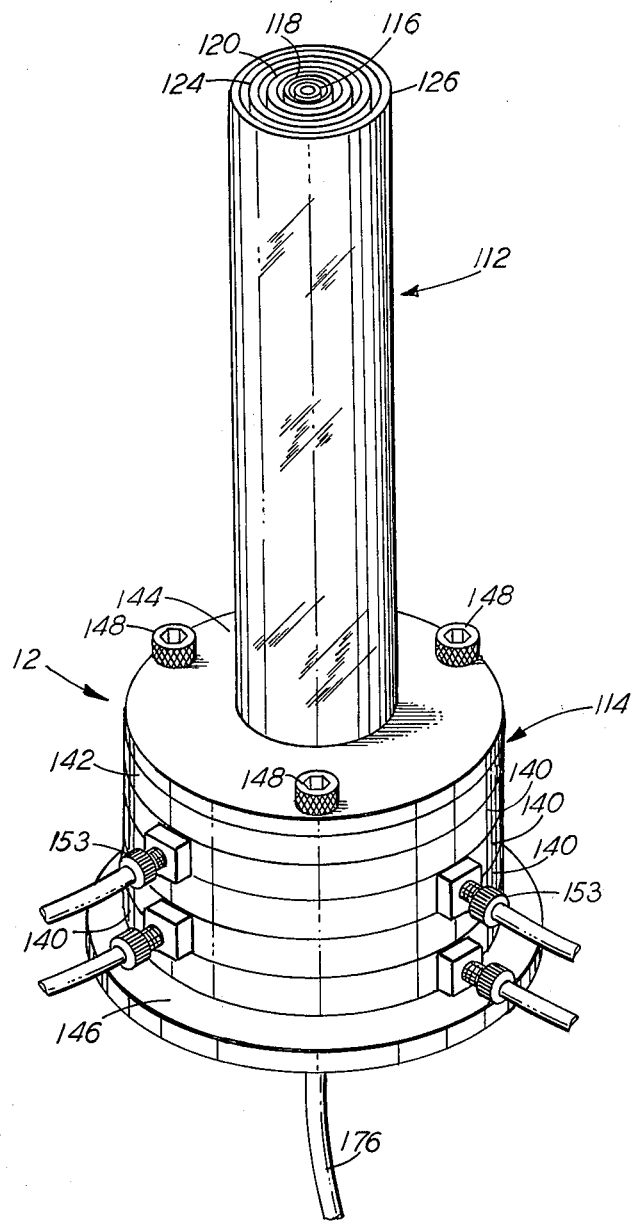
FIG. 2 is an isometric view of a soot torch used in the VAD chamber.

The torch 12 is shown in an isometric view in FIG. 2 and described in detail in copending patent application Ser. No. 371,628, titled "A Vapor-phase Axial Deposition Torch" by M. J. Andrejco and E. Potkay filed on even date herewith in the U.S. Patent and Trademark Office. The aforementioned patent application is assigned to the instant assignee and is hereby incorporated by reference herein. The torch 12 is comprised of a nozzle 112 and a base 114. The nozzle 112 is comprised of an inner glass tube 116, a plurality of intermediate glass tubes 118, 120 and 124 and an outer glass tube 126 all of which are concentrically mounted one inside the other. Additionally, a large diameter cylinder or shroud 127 is positioned about the outer glass tube 126 and extends beyond the end of the nozzle 112. The position of the shroud 127 can be adjusted to alter the focusing of the flame emanating from the nozzle 112 during the soot deposition process.

Figure 3:
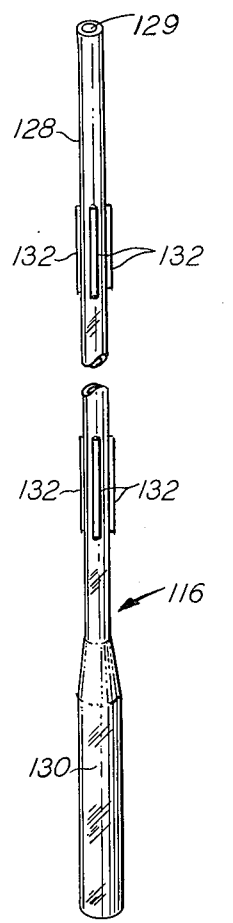
FIGS. 3, 4 and 5 are isometric views of the innermost, intermediate and outer tubes.

The inner tube 116, as can be seen in FIG. 3, is comprised of a first elongated, small diameter, section 128 having a bore 129 and a large diameter section 130. A plurality of splines 132—132 are fixedly mounted and equally spaced about the periphery of the section 128.

Figure 4:
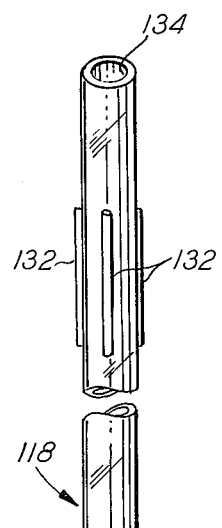

Each of the intermediate tubes 118, 120 and 124 are substantially the same, but have different diameters. Accordingly, only the tube 118 (see FIG. 4) will be described in detail. The tube 118 has a substantially uniform diameter bore 134, a plurality of fixedly mounted, equally spaced splines 132—132 on the periphery thereof and a radially extending flange 136 on one end thereof.

Figure 5:
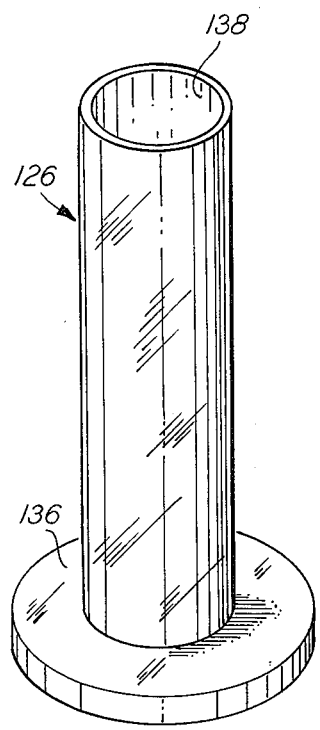

The outer tube 126 (see FIG. 5) is similar to the intermediate tubes 118, 120 and 124 and has a large diameter bore 138 and does not have any splines on the outer surface thereof. A flange 136 also radially extends from one end thereof.

The concentrically mounted tubes 116, 118, 120, 124 and 126 extend into, and are held in place by, the base 114 as can be seen in the cross-sectional view of FIG. 6. The base 114 is comprised of a plurality of annular support members 140—140 and a top member 142. The support members 140—140 and the top member 142, which may be a Teflon polymer material or the like, are held between a top plate 144 and a bottom plate 146 by a plurality of threaded rods 148—148 which pass therethrough. Each of the members 140—140 has an opening 152 in the peripheral wall thereof to threadably receive a gas line connector 153 (only one shown). Each of the openings 152—152 communicates with a respective one of a plurality of inner annular chambers 154—154 via a respective one of a plurality of channels 156—156. A plurality of washer shaped spacers 158—158 are located above and/or below respective flanges 136—136 of the intermediate tubes 118, 120 and 124 and the outer tube 126. A ferrule 162 having an axial passageway 164 therethrough is threadably inserted into the lowermost support member 140 while a cap 166 having an opening 168 therein is threadably positioned thereon.

The torch 12 is readily assembled by inserting the intermediate tubes 118, 120 and 124 inside, and concentric with, the outer tube 126. The splines 132—132 have an accurately machined thickness which maintains a predetermined, spaced relation between said tubes. The flanges 136—136 are positioned between the ring support members 140—140. Additionally, the annular shaped spacers 158—158 are located above and/or below each flange 136. Advantageously, the number of spacers 158—158 above and below each flange 136 may be readily changed in order to alter the height of one or more of the tubes relative to the other tubes. Thus, the end configuration of the nozzle 112 may be readily rearranged resulting in various configurations, three of which are shown in FIGS. 7, 8 and 9.

In addition to the ability to alter the configuration of the exhaust end of the nozzle 112, the inner tube 116 may be inserted through the opening 168 in the cap 166 through the passageway 164 in the ferrule 162 into the innermost intermediate tube 118 as shown in FIG. 6. The position of the tube 116 may be readily adjusted by sliding the tube along the passageway 164 to position the exhaust end thereof at the desired point relative to the ends of the other tubes 118, 120, 124 and 126.

The exhaust system 16 is shown schematically in FIG. 10 and is set forth in detail in copending patent application Ser. No. 371,630, titled "An Exhaust System for a Vapor Deposition Chamber" by E. Potkay, filed on even date herewith in the U.S. Patent and Trademark Office. The aforementioned patent application is assigned to the instant assignee and is hereby incorporated by reference herein. The system 16 is comprised of the serial combination of an exhaust tube 226, an outlet pipe 227, a first injection venturi 228, a soot collection chamber 232 and a discharge line 234 with a second injection venturi 236 therein. A third injection venturi 238 is connected to an intake line 241 which joins the discharge line 234 for connection to an exhaust hood (not shown).

Figure 11:
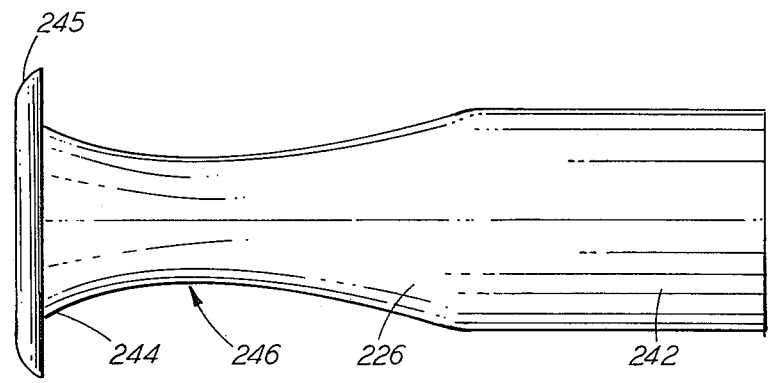
FIG. 11 is a side view of an exhaust tube used to implement the instant invention.

The exhaust tube 226 (see FIG. 11) has a substantially hollow cylindrical output end 242 and a flared intake 244 having a gradually turned back end 245. The tube 226 has a constricted throat section 246 intermediate the output end 242 and the intake 244.

The output end 242 of the exhaust tube 226 is fixedly positioned in a mounting plate 247. The mounting plate 247 is sealably fastened to a flange 248 on a first end 249 of the outlet pipe 227.

Figure 12:
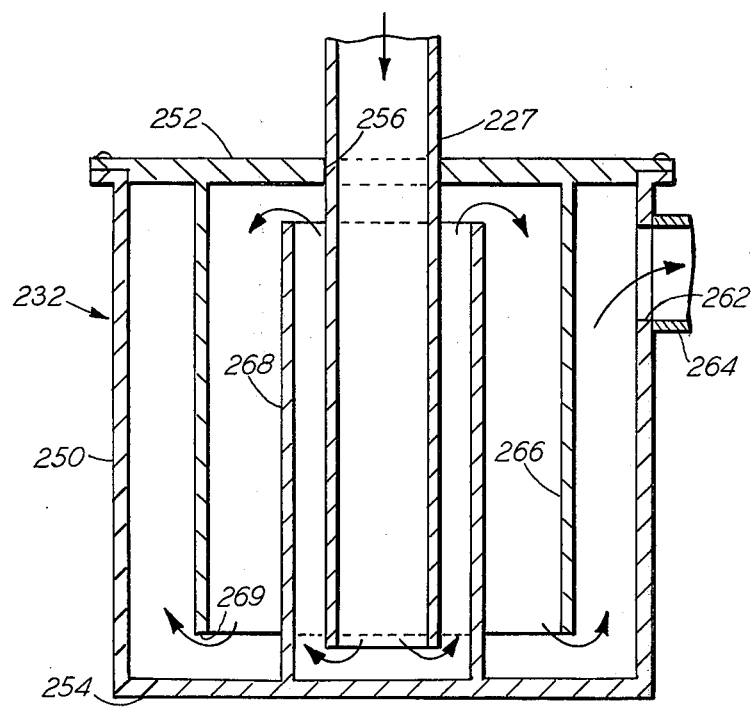
FIG. 12 is a cross-sectional view of a soot collection chamber used to implement the instant invention.

The soot collection chamber 32, shown in cross section in FIG. 12, is comprised of a cylindrical housing 250 having top and bottom plates 252 and 254, respectively. The top plate 252 has an opening 256 through which the outlet pipe 227 passes and projects into the central portion of the chamber 32. The housing 250 also has an opening 262 therein to receive a first end 264 of the discharge line 234. First and second concentric cylinders 266 and 268 are concentrically mounted within the housing 250. The first cylinder 266 is fixedly attached to, and depends from, the top plate 252 and has an unattached end 269 in spaced relation with the bottom plate 254. The second cylinder 268 is fixedly mounted on the bottom plate 254, within the first cylinder 266, and projects upward, towards and in spaced relation to, the top plate 252.

The injection venturies 228, 236 and 238 are of the in-line, injection type manufactured by the Nortel Machine Company, Buffalo, N.Y. (model AM-1500, glass filled Teflon polymer). Through a combination of the Bernoulli effect and momentum transfer from collisions between the high velocity gas accelerated through its orifice and stationary gas residing in the bore, the injection venturies induce a high volume flow rate of gas from one end of its bore to the other when supplied with a relatively low volume flow rate of compressed gas. An adjustable orifice allows the optimum gap to be selected for maximum performance from the injection venturies 228, 236 and 238 which provide control of exhaust line pressure drops across each injection venturi.

Filtered compressed air is supplied to each injection venturi 228, 236 and 238 by rotameters 272, 274 and 276, respectively. The operation of the injection venturi 236 strongly influences the pressure measured at $P_1$, in the housing 10 while the injection venturi 228 largely determines the differential pressure between the housing at $P_1$ and the outlet pipe 227 at $P_2$. Based upon the measurement of the differential pressure the rotameter 274 may be adjusted until the desired pressure (e.g., standard atmosphere 760 mm Hg) in the housing 10 is achieved. A pressure measuring apparatus 277 references ambient pressure $P_A$ which is monitored by a barometer 278. The differential pressure $(P_1 - P_2)$, monitored by a pressure gauge 279 is nominally selected to a predetermined pressure by adjusting the rotameter 272 which controls the flow of gas through the injection venturi 228. The injection venturi 238 provides minor control of the overall pressures in the exhaust line 234 and is useful only to allow mid-range biasing of the injection venturies 228 and 236.

The meters 277 and 279 and the barometer 278 may be any of those well known in the art that may be monitored visually by an operator. Alternatively, the meters 277 and 279 as well as the barometer 278 may have digital outputs connected to a computer control (not shown) which provides a feedback signal to the rotameters 272, 274 and 276 to control the flow of air to the venturies 228, 236 and 238 to continuously control the pressure within the system 16 and the housing 10.

In operation (see FIGS. 1 and 10), the arcuate plate 40 is moved within the guide members 41—41 to position the axis of the nozzle 112 of the torch 12 at a predetermined angle (e.g., 35°) to the axis of the starting member 58 with the nozzle directed at the end portion 62 thereof. Additional baffles 32—32, shown in FIG. 10 may be mounted within the chamber 5 to further eliminate undesirable secondary flow patterns, improve reactant deposition, and tailor soot particle trajectories in the vicinity of the deposition surface.

Gaseous reactants such as $SiCl_4$; $GeCl_4$; $POCl_3$ or the like in an argon carrier gas flows from a source, not shown, into a flexible tube 176 and through the inner tube 116 as shown in FIG. 6. Other gases are caused to flow through the channels 156—156 into their respective chambers 154—154 and out the discharge end of the nozzle 112. Gases such as $SiCl_4$ flow between the tubes 116 and 118, hydrogen flows between the tubes 118 and 120, argon flows between tubes 120 and 124 while oxygen flows between tubes 124 and 126.

Background gas, such as argon or air, of a metered quantity is injected into the housing 10 through the opening 34; such gas is required to effect the exhaust of the undeposited soot.

As hereinbefore indicated, the axial position of the inner tube 116 may be readily changed. At times it may be desirable to periodically adjust the location of the discharge end of the tube 116 during deposition. By loosening the end cap 166 the tube 116 may be moved the appropriate distance and the cap tightened to hold the tube at the desired position. Additionally, at times, it may be desirable to alter the deposition of the reactants in a periodic or aperiodic fashion to alter the refractive index of the resultant lightguide preform. This can easily be accomplished by loosening the cap 66 and moving the tube 16 axially in and out to controllably alter the location of the discharge end of the tube 16 during deposition. Such axial movement may be implemented manually or automatically in a well known manner.

Gases passing from the nozzle 112 of the torch 12 are ignited and glass raw material introduced into a high temperature portion of the flame near the tip of the nozzle to produce a soot which is deposited to form a rotating boule 302 as shown in FIG. 10. The soot boule 302 is simultaneously rotated and withdrawn from the VAD system 5 through the input section 14. Inert gas is directed into the chamber 5 between the surfaces of a growing porous boule 302 and the inner surface of the small diameter section 56 of the input section 14 as indicated by the arrows. The intake 244 of the exhaust tube 226 is located proximate the rotating soot boule 302. The undeposited soot and gases are drawn into and through the exhaust tube 226.

It has been found that the flared intake 244 with the gradually turned back end 245 is effective in removing undeposited soot located behind the flared intake which can be seen as a migration of undeposited soot flowing into the exhaust tube 226 as indicated by the arrows. Additionally, the gradually turned back end 245 substantially eliminates turbulence of gases at the intake 245 which further enhances soot deposition on the boule 302.

The constricted section 246 of the exhaust tube 226 accelerates the combustion by-products and undeposited soot extracted from the deposition chamber 5 and as a consequence, produces a forward pressure drop between the chamber and the outlet pipe 227. Differential pressures of 1.2 to 1.3 mm $H_2O$ have been attained using the instant exhaust tube 226. Additionally, the use of the exhaust tube 226 having a flared intake 244 with the gradually turned back end 245 has been found to substantially eliminate turbulence in the flow of gases within the housing 10 proximate the flared intake 244 of the exhaust tube 226.

The exhausted gases and undeposited soot pass from the exhaust tube 226, through the outlet pipe 227 and the injection venturi 228 into the soot collection chamber 232. The chamber 232 performs the dual function of extracting soot from the exhaust stream while providing some degree of isolation between the housing 10 and downstream pressure fluctuations. The soot collection chamber 232 (see FIG. 12) provides a serpentine path to the soot and exhaust gases directed therein. The exhaust gases and soot are directed axially into the chamber 232 through the outlet pipe 227. The heavier soot particles will deposit on the bottom plate 254 while lighter particulate may deposit on the surfaces of the cylinders 266 and 268 as well as the inside wall of the housing 250.

The exhaust gases exiting the line 234 expand radially outward and move upward, toward the top plate 252 where the gas again expands. This process is repeated until the gases are finally exhausted through the opening 262 and pass into the discharge line 234. The gases, with any soot residue therein are moved through the discharge line 234 (see FIG. 10), under the control of the injection venturies 236 and 238, and exit into an exhaust hood (not shown).

Once the soot boule 302 has reached the desired length it may be fully removed from the housing 10 and heated to its consolidation temperature resulting in a clear, solid lightguide preform. Alternatively the boule may be heated as it is withdrawn from the housing 10 to continuously form the lightguide preform.

It has been found that the instant housing 10 which provides a substantially two-dimension geometry substantially eliminates large secondary gas circulation cells which are three-dimensional in nature. Such elimination of secondary gas circulation cells appears to be due to the confinement imposed by the limited depth of the housing 10. The ratio of the diameter of the housing 10 to the housing depth should be greater than 1.5:1 while the ratio of the housing depth to the diameter of the soot boule 302 is less than 3:1. In a particular working embodiment the diameter of the housing 10 was ten inches, the depth was five inches and the boule diameter was two inches.

The housing 10, the baffles 32—32, the end plates 26—26, the input section 14 and the exhaust tube 226 were fabricated from Pyrex glass. However, various other glasses or metallic materials may be used.

It has been determined empirically that by changing the positions of the baffles 32—32 in the housing 10, trajectories of soot particles are altered in the vicinity of the deposition surface, and hence, an optimum configuration for particular deposition rates can be determined. The use of the torch 112 and the exhaust system 16 in combination with the baffled housing 10 results in a gas flow pattern that substantially eliminates flame flicker and wander resulting in a soot deposition process in which the deposition rate, the density of the soot boule, the boule growth rate and the shape of the deposition surface are reproducible to a degree not heretofore attainable.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A vapor-phase axial deposition system for fabricating a lightguide soot boule, comprising:
    means for rotating a starting means about and along an axis thereof;
    means for projecting a stream of soot formed in a flame, towards the starting means to form the soot boule thereon, the axes of the starting means and the soot stream being in a first plane; and
    first and second planar surfaces positioned on opposite sides of the first plane, the distance between said planar surfaces being sufficiently close so as to substantially eliminate flame flicker and wander during the formation of the soot boule.

2. The vapor-phase axial deposition system as set forth in claim 1, comprising:
    an exhaust system, having an exhaust tube with a longitudinal axis in said first plane.

3. The system as set forth in claim 1 or 2, wherein: the distance between said first and second surfaces is less than three times the diameter of the soot boule to be fabricated.

4. A vapor-phase axial deposition system, comprising:
    a housing having a hollow, cylindrical, body with first and second end plates affixed threto, the body having a diameter greater than its depth;
    an input section adapted to remove or insert a starting member through the cylindrical body;
    a soot projecting means having a nozzle projecting into the cylindrical body to deposit soot, formed in a flame, onto the starting member wherein the first and second end plates are spaced sufficiently close so as to substantially eliminate flame flicker and wander; and
    an exhaust system having an exhaust tube projecting into said body to remove undeposited soot and gas from the housing, the axes of the input section, the nozzle and the exhaust tube being located in the same plane which is normal to the axis of the housing.

5. A vapor-phase axial deposition system as set forth in claim 4, wherein:
    the housing diameter to depth ratio is greater than 1.5:1 and the ratio of the housing depth to the boule diameter is less than 3:1.

6. The system as set forth in claim 1 or 4, wherein the soot projecting means is comprised of:
    a plurality of coaxially aligned tubes with a coaxially aligned inner tube that is movable in an axial direcion relative to the other tubes during the deposition process.

7. The system as set forth in claim 4 or 5, wherein:
    at least one baffle is positioned within said housing to control the flow of gases therein.

8. A vapor-phase axial deposition system, comprising:
    (a) chamber having a hollow cylindrical body with first and second end plates affixed thereto, the body having a diameter greater than its depth;
    (b) an input section adapted to remove or insert a starting member through the cylindrical body;
    (c) a soot projection means having a nozzle projecting into the cylindrical body to deposit soot on the starting member;
    (d) an exhaust system, comprising:
        (1) an outlet pipe;
        (2) a hollow, substantially cylindrical exhaust tube, interposed between the chamber and the outlet pipe, having intake and exhaust ends wherein the tube has a constricted portion intermediate said ends and the intake end is flared with a gradually turned back edge; and
    (e) the exhaust tube projects into said body to remove undeposited soot and gas from the housing, the axes of the input section, the nozzle and the exhaust tube being located in the same plane which is normal to the axis of the chamber.

9. A method of fabricating a substantially cylindrical lightguide soot boule in a vapor-phase axial deposition system, comprising:
    projecting a stream of soot, formed in a flame, in a first plane, towards a deposition portion of a forming cylindrical soot boule, the axes of the boule and the soot stream being in a first plane; and
    confining the first plane between first and second planar surfaces, the distance between said planar surfaces being sufficiently close so as to substantially eliminate flame flicker and wander during the formation of the soot boule.

10. The method as set forth in claim 9, characterized by:
    maintaining the distance between said first and second surfaces at less than three times the diameter of the soot boule to be fabricated.

11. A vapor-phase axial deposition system for fabricating a lightguide soot boule, comprising:
    (a) a chamber;
    (b) means, projecting into said chamber, for rotating a strating means about and along an axis thereof;
    (c) means for projecting a stream of soot, formed in a flame, towards the starting means to form the soot boule thereon, the axes of the starting means and the soot stream being in a first plane;
    (d) an exhaust system comprised of:
        (1) an outlet pipe; and
        (2) a hollow, substantially cylindrical exhaust tube with a longitudinal axis in said first plane, interposed between the chamber and the outlet pipe having intake and exhaust ends wherein the tube has a constricted portion intermediate said ends and the intake end is flared with a gradually turned back edge; and
    (e) first and second surfaces mounted on opposite sides of the first plane, the distance between said surfaces being sufficiently close so as to substantially eliminate flame flicker and wander during the formation of the soot boule.

* * * * *